United States Patent [19]
Day et al.

[11] 3,724,423
[45] *Apr. 3, 1973

[54] APPARATUS FOR GROWING CRUSTACEANS

[75] Inventors: John J. Day; Paul S. Hirschman, both of Fort Lauderdale, Fla.

[73] Assignee: Ocean Protein Corporation, New York, N.Y.

[ * ] Notice: The portion of the term of this patent subsequent to Apr. 25, 1989, has been disclaimed.

[22] Filed: Dec. 8, 1970

[21] Appl. No.: 96,137

Related U.S. Application Data

[63] Continuation-in-part of Ser. No. 887,819, Dec. 4, 1964, Pat. No. 3,658,034.

[52] U.S. Cl............................................119/4, 119/5
[51] Int. Cl. ................................................A01k 61/00
[58] Field of Search........................................119/2–5

[56] References Cited

UNITED STATES PATENTS

| | | |
|---|---|---|
| 3,083,686 | 4/1963 | Thorsell et al............................119/3 |
| 3,086,497 | 4/1963 | Novello....................................119/2 |
| 3,118,424 | 1/1964 | Willinger..................................119/5 |
| 3,255,731 | 6/1966 | Girard......................................119/3 |
| 3,294,061 | 12/1966 | Hanks......................................119/4 |
| 3,196,833 | 7/1965 | Glancy.....................................119/4 |
| 3,304,912 | 2/1967 | Hackman et al. ........................119/5 |
| 3,658,034 | 4/1972 | Day et al. .................................119/2 |

*Primary Examiner*—Aldrich F. Medbery
*Attorney*—Darby & Darby

[57] ABSTRACT

Apparatus and method for providing optimum conditions for the growth and maturation of crustaceans during the post-larval period. A series of interconnecting tanks is provided. Habitats are positioned in each growing tank to promote the growth of the post-larval crustaceans, the type of habitat in a tank being provided to accommodate different size animals. The water environment in each tank is continuously changed to remove waste materials from the tank, thereby promoting growth of the crustaceans. The temperature of the water environment is also maintained at an optimum level to further such growth.

10 Claims, 15 Drawing Figures

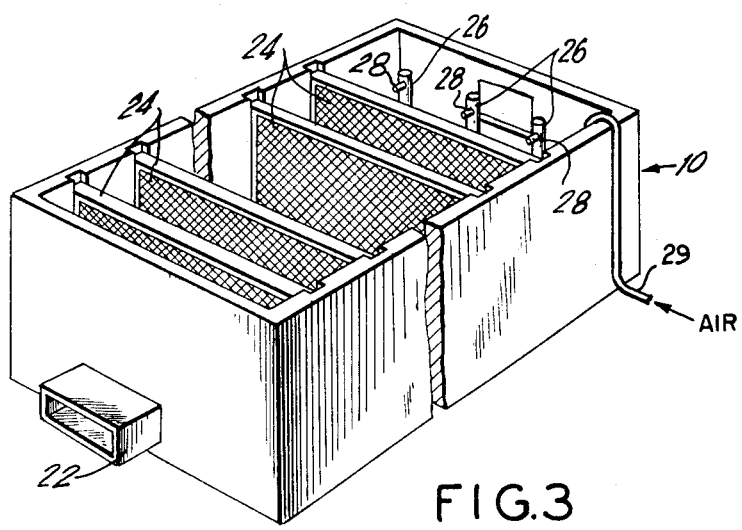
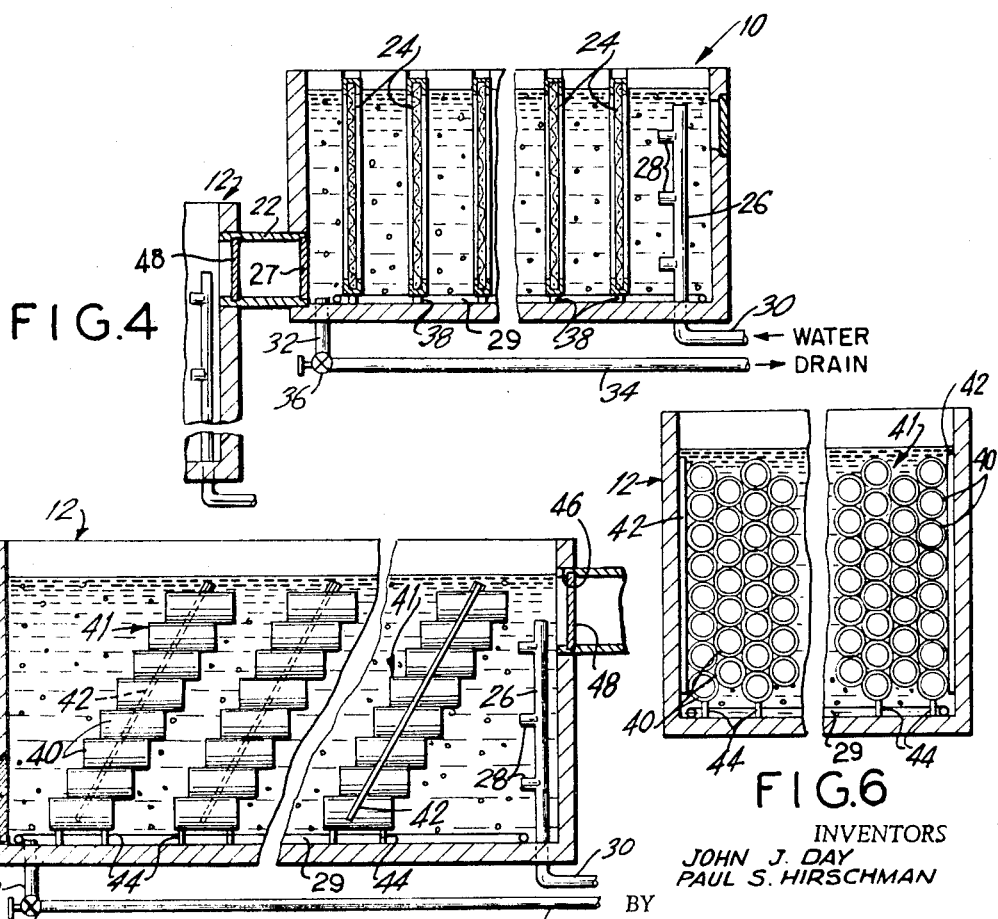
INVENTORS
JOHN J. DAY
PAUL S. HIRSCHMAN
BY
Darby & Darby
ATTORNEYS

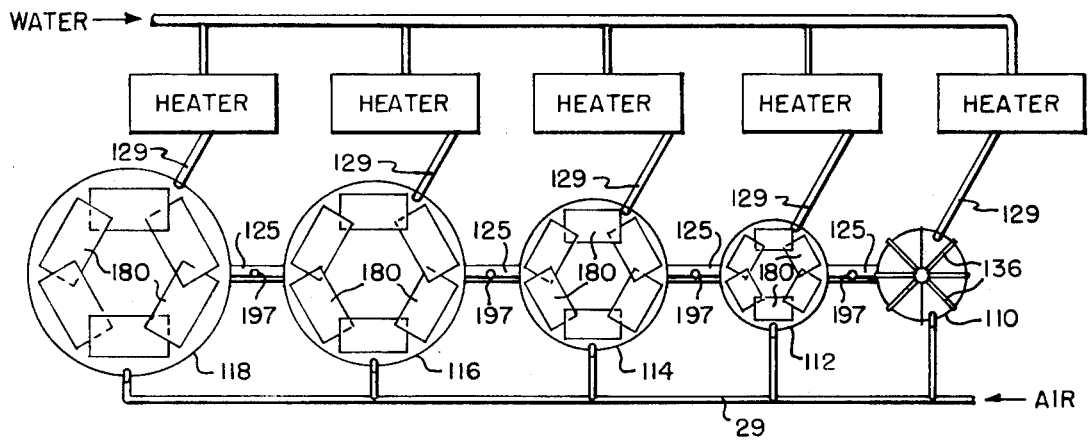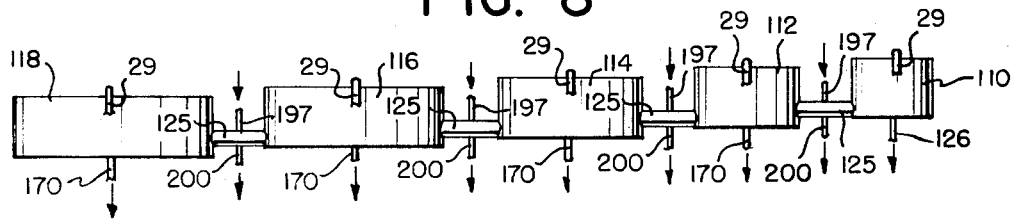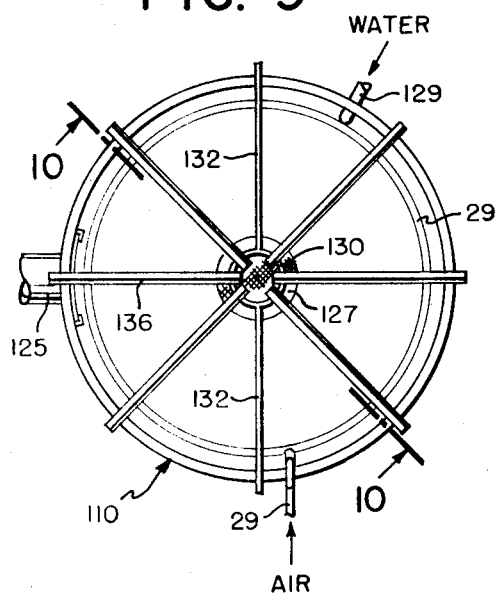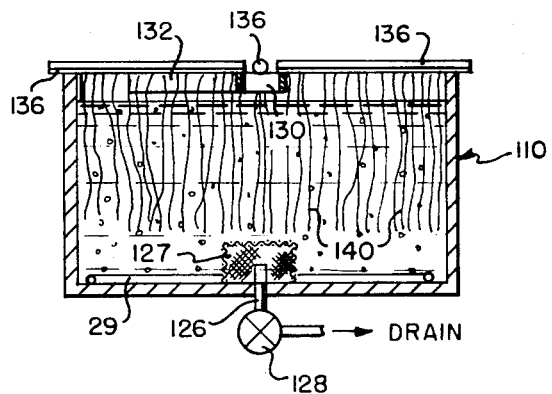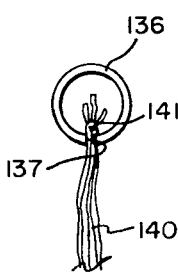

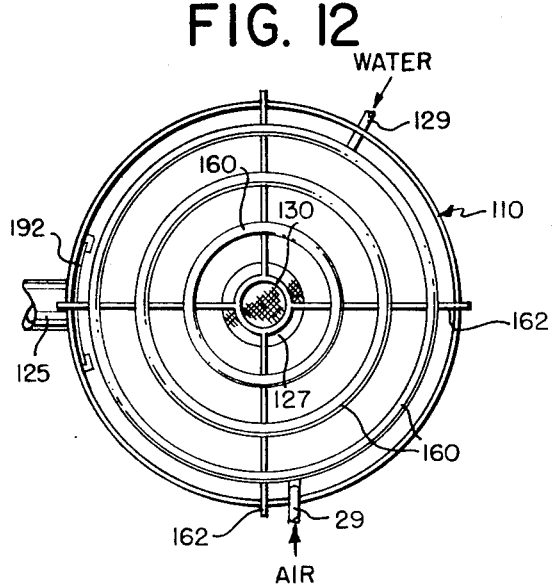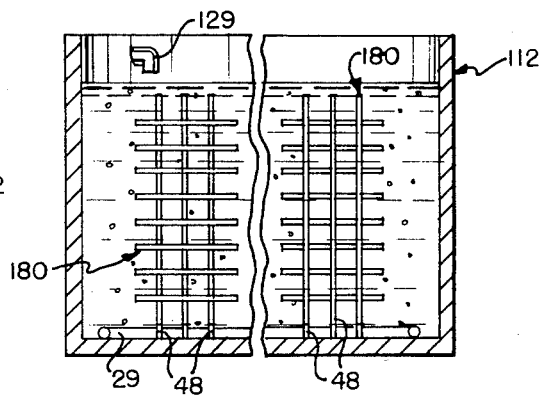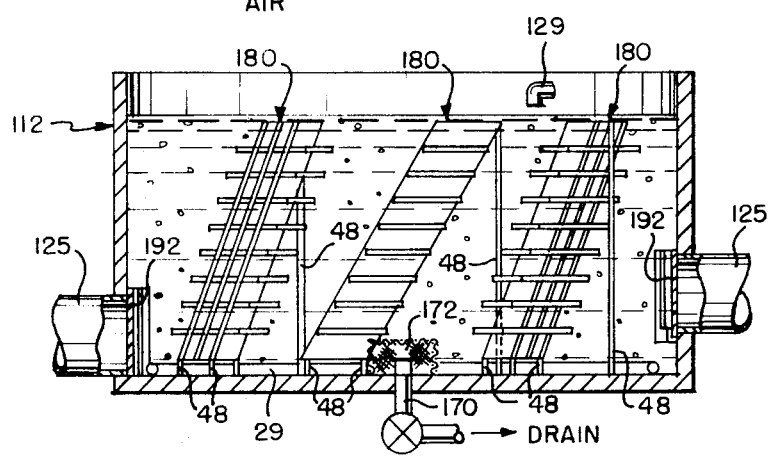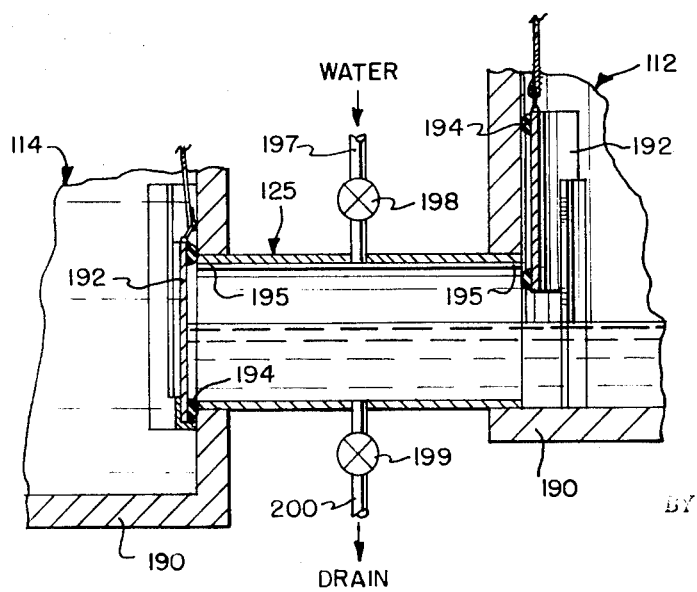

APPARATUS FOR GROWING CRUSTACEANS

BACKGROUND OF THE INVENTION

This application is a continuation-in-part of our prior copending application Ser. No. 887,819, filed Dec. 24, 1969 now U.S. Pat. No. 3,658,034, entitled "GROWING TANK FOR CRUSTACEANS", which is assigned to the same assignees.

FIELD OF THE INVENTION

This invention relates to the field of the husbandry of crustaceans and particularly relates to an apparatus and method for optimizing the growth of crustaceans during the post-larval to adult periods.

DESCRIPTION OF THE PRIOR ART

Prior art techniques in the husbandry of crustaceans are generally primitive in nature. A widely used method of growing crustaceans is to place a large number of crustaceans in a closed body of water such as a pond, allowing the crustaceans to breed and grow and harvesting adult crustaceans from time to time. Although this method is advantageous in that it provides a degree of control over the growing and harvesting of the crustaceans, a number of problems have arisen.

Certain crustaceans, especially caridean shrimp, tend to be quite cannibalistic and territorial in nature. Unless the individual crustacean is provided with sufficient territorial space within which to grow and mature, the crustaceans will attack and eat each other.

Another problem present in the prior art is that where large numbers of crustaceans are growing and maturing within a confined area, a large quantity of waste products is produced by the crustaceans. Unless these waste products are removed from the crustaceans' water environment, the growth of the crustaceans will be retarded. Where crustaceans are grown in a confined body of water such as a pond, removal of waste material is impractical. It is thus desirable that waste material be removed in order to optimize growth of the crustaceans within the shortest period of time.

As still a further problem in prior art systems it has been found that in the early post-larval period, growth of crustaceans is critically affected by the temperature of the water environment and sharp fluctuations in such temperature. Although the effect of temperature and fluctuations thereof diminishes as the crustaceans mature, it is still desirable to maintain a constant temperature during the entire growth cycle. In the pond environment it is difficult, if not impossible, to control the temperature.

Where crustaceans are permitted to develop and mature in a pond, harvesting of adult crustaceans is often difficult. In order to make husbandry of crustaceans more efficient it is desirable that crustaceans be systematically harvested when they have reached maturity.

It is thus an object of the present invention to provide method and apparatus for enabling large quantities of crustaceans to grow and mature to adulthood while minimizing cannibalism.

It is another object of the present invention to provide method and apparatus for optimizing the growth of crustaceans through the continuous removal of waste material from the water environment inhabited by the crustaceans.

It is still another object of the present invention to provide method and apparatus for maintaining the temperature of the water environment of the crustaceans at a constant level and with as few fluctuations thereof as possible.

It is still another object of the present invention to provide method and apparatus for systematically growing and harvesting crustaceans.

Another object is to provide a method and system for growing crustaceans in which the animals are successively transferred from tank to tank at various times in life cycles, each tank providing the environment necessary to sustain the animal and provide further growth during a particular period of the animal's life cycle.

A further object is to provide a system for growing crustaceans from the post-larval stage to adults in which a series of tanks are provided each of which has a type of habitat suited to the particular period in the life cycle of the animal.

SUMMARY OF THE INVENTION

This invention comprises method and apparatus for providing the optimum environment for the growth and maturation of crustaceans during the post-larval to adult periods. The apparatus comprises a series of interconnected tanks, each of which contains a plurality of habitats for crustaceans. The first tank is adapted to provide an environment for the initial post-larval stage of the crustaceans and this tank contains a plurality of habitats suitable for crustaceans of the post-larval size and age. Succeeding tanks for larger animals contain individual habitats for the animals. These habitats preferably comprise individual compartments arranged in vertically slanted racks, which are removable from the tanks.

Water, maintained at an optimum desired temperature, is continually circulated throughout each tank to dispose of waste materials. This water is preferably filtered so that it can be re-used.

When the crustaceans in a given tank have attained a given size, they are removed to the next tank. This can be done by permitting the water from one tank to cascade into the next succeeding tank. To facilitate this each tank is preferably positioned at a lower height than the preceding tank. Transfer of the animals also can be accomplished by a transfer gate arrangement.

DESCRIPTION OF THE DRAWINGS

FIG. 3 is an isometric view of a growing tank of this invention for crustaceans in the initial post-larval stage showing habitants for crustaceans as vertically disposed screens within the tank;

FIG. 4 is a side sectional view of the tank of FIG. 3;

FIG. 5 is a side sectional view of a growing tank of the present invention for crustaceans after the initial post-larval stage showing the habitat for crustaceans as segments of cylindrical pipe vertically stacked at diagonals within the tank;

FIG. 6 is a front sectional view of the embodiment of FIG. 5;

FIG. 7 is a top view of another growing system;

FIG. 8 is an elevational view of the growing system of FIG. 7;

FIG. 9 is a top view of one form of a post-larval tank;

FIG. 10 is a cross-sectional view taken on line 10—10 of FIG. 9;

FIG. 11 is an end view of a spoke arm for holding the habitats;

FIG. 12 is a top view of another form of post-larval tank;

FIGS. 13 and 14 are views of one of the growing tanks; and

FIG. 15 is an elevational view, partly in cross-section of a transfer tunnel.

DESCRIPTION OF THE INVENTION

Figure 1:
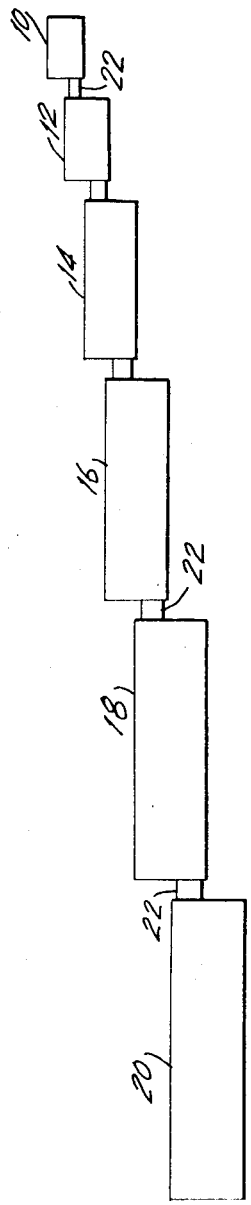
FIG. 1 is a schematic elevation view of one embodiment of the apparatus of the present invention showing a series of cascaded growing tanks.
Figure 2:
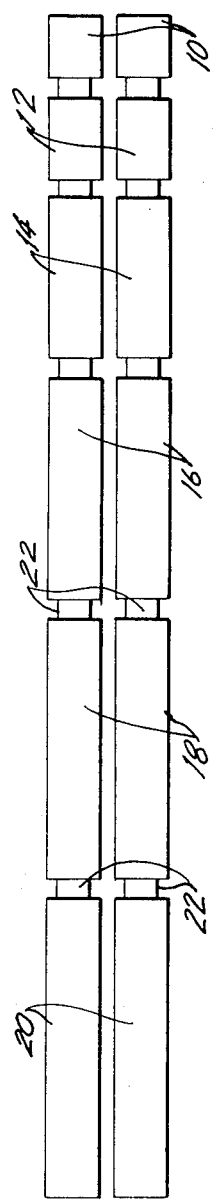
FIG. 2 is a plan view of the apparatus of the present invention shown in FIG. 1.

FIGS. 1 and 2 depict one embodiment of the invention in which a plurality of cascaded growing tanks 10, 12, 14, 16, 18, 20 are used. Each succeeding tank is shown displaced lower in height than the preceding tank in order to permit emptying the contents of the preceding tank thereinto. Thus, tank 12 is shown positioned lower than tank 10, tank 14 positioned lower than tank 12, and so on. Interconnection between tanks is provided by means of conduits or pipes 22 extending between adjacent tanks. Although pairs of side-by-side tanks are shown for each stage, any number of tanks positioned side-by-side may be utilized. In such case and for greatest efficiency, the same number of side-by-side tanks should be provided at each stage of the series of tanks.

In order to accommodate the increasing size of the crustaceans during post-larval maturation, it is desirable that each successive tank be larger than the preceding tank if it is to hold the same number of animals as the preceding tank. The necessity for this successive increase in size of the tanks will be appreciated from the fact that in the initial post-larval stage an individual crustacean may be only one-third of an inch long whereas when the crustacean is fully matured it may be up to 10 inches long. As an alternative to increasing the size of the tanks, the number of tanks per given stage can be increased. Thus, for example, in one system there can be one post-larval tank 10 used with several final stage tanks 20. This difference in the size of the crustacean from the initial post-larval to the adult stage also necessitates the provision of different modes of habitat. This is discussed below.

As shown in FIGS. 3 and 4, growing tank 10 is adapted to provide for growth of crustaceans during the initial post-larval period. To this end tank 10 is provided with a plurality of vertically disposed screens 24 which serve as habitats for crustaceans introduced into tank 10. Screens 24 rest on standoffs 38, thus permitting flow of water around the screens as well as through the mesh of the screen. Water is introduced into tank 10 by means of pipes 26 having outlets 28. Pipes 26 are connected to a supply pipe 30. Water is drained from tank 10 by means of standpipes 32 connected to drainpipe 34 by means of valves 36. In this manner a continuous circulation of water between pipes 26 and pipes 32 is provided. If desired, a filter system (not shown) can be provided and the drained water recirculated back into the tank after it is filtered. Screens 24 are positioned in tank 10 so that their longitudinal axes are transverse to the direction of water flow. In this manner, water passes through the screens to carry off waste material. Tank 10 is further provided with outlet pipe 22 and a gate 27 in its outlet opening to permit draining of tank 10 into the next growing tank 12. An air supply pipe 29 is also provided which rests on the floor of the tank. This ensures that the animals have sufficient oxygen.

Screens 24 greatly increase the surface area provided for crustaceans to mature as compared to the surface area of a tank not provided with such screens. In this manner, substantially larger quantities of crustaceans may be accommodated in each tank When crustaceans are introduced into the tank they will crawl up the screens and occupy a position on the screen's surface. This position will serve as an area within which each crustacean may grow, free from the fear of being attacked by other crustaceans. The dimensions of the screens will be largely dictated by the inner dimensions of tank 10. The screen may be of any suitable material, although it is preferable that such material be impervious to the corrosive effects of the water environment in the tank. Such a non-corrosive material, for example, is fiberglass. The mesh openings of the screen material may be of any suitable size, such as that of common household window screens.

FIGS. 5 and 6 show the growing tank of the present invention as used in the successive stages of growth after the initial post-larval period. Tank 12 is provided with supply pipes 26 and standpipes 32 to provide continual circulation of water in the tank. The air supply pipe 29 is also used. Positioned within the tank are habitats comprising stacks of segments 40 of cylindrical pipe arranged with their longitudinal axis aligned with the longitudinal axis of the tank. As will be explained hereinafter, in each vertical stack the pipes are diagonally stepped and rigidly secured one to the other to form a single rigid unit 41. Pipe segments 40 may be of any suitable cross-sectional shape and of any suitable material. However, it is preferable that such material have non-corrosive properties, such as has fiberglass, polyethylene, polyvinyl-chloride or the like. Each unit 41 rides on diagonally disposed tracks 42 and rests on stand-offs 44. A plurality of such units are preferably provided in each tank to increase the number of crustaceans which the tank is capable of holding while permitting each crustacean to grow protected from every other crustacean.

Tank 12 is further provided with inlet opening 46 which is closed off by gate 48 and with an outlet opening 50 which is closed off by gate 52. The gates 48 and 52 are the inlet and outlet pipes 22.

Each successive tank 14, 16, 18 and 20 is preferably constructed in the same manner as tank 12. In order to accommodate the increasing size of the crustaceans during the maturation period each successive tank is preferably larger in size and is provided with pipe segments 40 of successively greater diameter and length.

In order to use the apparatus and method of the present invention, post-larval crustaceans, such as the fresh water shrimp species Macrobrachium carcinus, are first introduced into tank 10. Such introduction may be accomplished by pumping the post-larval crustaceans from a hatching tank where the crustaceans have undergone a metamorphosis from the larval to post-larval stage.

The post-larval crustaceans are introduced into tank 10 in a water environment. Upon introduction the crustaceans spread throughout the water environment and each crustacean seeks out a space which will be its habitat where it can mature protected from the other crustaceans in the tank. Since the post-larval crustacean is essentially a crawler and not a swimmer the crustacean will crawl up the mesh material of screens 24 to locate a space for its habitat. The crustacean will cling vertically to the surface of the screen during maturation in tank 10.

Once establishing its habitat, the crustacean will remain there except to obtain food which may have fallen to the bottom of the tank. In such case, the crustaceans will recognize the bottom of the tank as a neutral territory and will not attack one another during recovery of food. Since many crustaceans have a homing instinct, each may return to the space which he had established as a habitat.

The vertically disposed screens increase the stocking density of the tank by greatly increasing the surface area available for crustaceans to establish habitats. The vertically hanging screens 24 are spaced as closely together as possible to maximize the number of crustaceans which may be matured in the tank. Being spaced closely together, the vertical screens simulate the natural water environment of shrimp, wherein closely spaced fronds are disposed in the water, thus providing darkness and creating a feeling of security in the maturing crustaceans. It has been found that the growth of crustaceans such as shrimp is greatly impaired if the shrimp does not feel secure and protected from danger. By permitting each crustacean to establish its habitat in a dark and protected space, the growth rate of the crustacean is greatly increased, thus maximizing production of the crustaceans.

It has been found that waste materials and uneaten food building up within the water environment of the tank retards growth of the crustaceans. It has also been found that crustaceans grow, especially in the intial post-larval stage, at an optimal water temperature and that major fluctuations in the water temperature retard growth and may even kill the maturing crustaceans.

In order to optimize growth of the crustaceans, water maintained at a constant temperature is circulated through tank 10 by means of pipes 26 and 32. The specific temperature to be maintained will vary according to the specific species of crustaceans being grown in the tank. The tank temperature can be raised either by using heaters in the individual tanks or by preheating the water supplied through pipe 30.

After the crustaceans have been allowed to mature in tank 10 for a period of approximately 2 months, they will have grown to about 1 inch in length and will have outgrown their habitats in tank 10 and thus will be ready for transfer to tank 12. Transferral is brought about by lifting the screens from the water, thus forcing the crustaceans to move from their habitats on the screen into the water. The outlet gate 27 of tank 10 is then opened and the water and crustaceans will pass through pipe 22 into the next succeeding tank 12 whose gate 48 to the inlet is opened.

After tank 10 has been emptied out, screens 24 may be replaced after they have been cleaned. The outlet of tank 10 is closed and the tank is ready to receive a new group of post-larval crustaceans.

When the crustaceans coming from tank 10 have entered tank 12 they will again seek out individual areas to establish as habitats where they will feel protected during their next stage of growth. Being territorial by nature, they will defend their habitats against other crustaceans. In tank 12 habitats are provided by pipe segments 40. As with screens 24 of tank 10, segments 40 provide a dark space wherein the crustaceans can feel protected during maturation. This feeling of security, as noted above, greatly increases the growth rate of the crustaceans.

A unit 41 of pipe segments 40 is diagonally stepped in order to permit the crustaceans to crawl from the bottom of the tank to upper uninhabited habitats. Stand-offs 44 space a unit of habitats or segments 40 from the bottom of the tank so that crustaceans will not be crushed after the unit is replaced in the tank after cleaning and so that water may circulate both through and around the segments 40.

As in tank 10, pipes 26 and 32 provide circulation of water at a substantially constant temperature, which can be accomplished by any suitable means, in order to eliminate waste materials from the crustaceans' environment and thereby optimize growth of the crustaceans. Pipes 26 and 32 and the longitudinal axis of segments 40 are so positioned that the direction of flow of water will be through the length of segments 40. Although maintenance of the temperature of the water at a predetermined level is not as critical at these later stages of development of the crustaceans as during the initial post-larval stage, it is still desirable to keep the water at an optimum temperature level and to minimize fluctuations in such temperature for maximum growth.

When the crustaceans have outgrown their habitats in tank 12 they are transferred to tank 14 by removing the units of pipe segments from the tank and tipping them at a 90° angle to force the crustaceans into the water. Gate 52 is then opened and the crustacean-filled water is cascaded through outlet opening 50 into the next succeeding tank 14. Gate 52 is then closed and units 41 replaced in tank 12 after they have been cleaned. Tank 12 is now ready to receive another batch of crustaceans from tank 10 through inlet opening 46 after gate 48 has been opened.

The crustaceans are successively matured in tanks 14, 16, 18 and 20 and ultimately harvested from tank 20 when they have reached full maturity. As indicated hereinabove, the diameter and length of segments 40 are successively increased in the tanks in order to accommodate the increased size of the crustaceans.

In practice, the crustaceans in tank 20 are first harvested. Tank 20 is cleaned and tank 18 is then emptied into tank 20. After tank 18 has been cleaned, tank 16 is emptied into tank 18 and each succeeding tank up to tank 10 is emptied into the next tank.

Although rectangularly shaped tanks have been described it will be understood that other configurations such as round, oval and the like are considered to be within the scope of the prevent invention. Similarly, the geometrical shape of pipe segments 40 and the pattern of screen 24 may be varied from that shown and described.

FIGS. 7 and 8 show a view of another embodiment of growing system according to the invention. Here, round tanks are used instead of rectangular tanks. As shown, there are five cascaded round tanks 110, 112, 114, 116 and 118. The tanks are again located one above the other in cascaded sequence to facilitate transfer of the animals from one tank to the next. A transfer tunnel 125, to be described below, is located between two successive tanks. As in the case of FIGS. 1 and 2, the tanks are shown of progressively larger diameter to accommodate larger size animals at the various stages of the growing cycle. As before, a branch arrangement can be used with tanks of the same diameter, for example, one tank 110 supporting two tanks 112. In the system of FIGS. 7 and 8, air is again supplied to each tank by a pipe 29 branching out from a manifold. Also, each tank has a water inlet 129 shown being supplied from a separate heater so that each tank can be kept at a desired temperature. Suitable coolers also can be used, if needed. The heaters or coolers can be located in the respective tank.

FIGS. 9 and 10 show the post-larval growing tank 110. The tank has a drain 126 which is covered by a screen 127 of a mesh size sufficiently small to keep the animals from being sucked down the drain. The drain empties into a pipe which is open and closed by a valve 128. The water inlet 129, in the form of a pipe, is shown at the top of the tank. The water from drain 126 can be recirculated back to inlet 129 or to the main pipe line supplying the heaters after filtering in a suitable system (not shown).

A central support 130 is held by a pair of brackets 132 mounted on the walls of the tank. If desired, support 130 can also be held by a member mounted on the bottom of the tank floor or by a member suspended above the tank. A plurality of spokes 136 have their ends resting on the support 130 and on the outer wall of tank 110. Each of the spokes support a number of grass-like habitats 140. The habitats are formed of strands of a suitable non-reactive, non-corrosive, non-toxic material. One suitable material has been found to be SARAN plastic.

As seen in FIG. 11, a number of the strands, which can be monofilament, are tied in bunches to form a head 141. The head is slipped into a slit 137 in the spoke 136. A plurality of bunches of strands 140 are provided along the length of each spoke 136. The strands 140 have a length such that they are above the bottom of the tank. This permits water flow at the bottom of the tank. The water flow will be generally circular in view of the shape of the tank and the position of inlet 129 and drain 126.

The grass-like habitats provided by the strands have several advantages over the screens 24 described in FIGS. 1 and 2. First of all, they afford the animals a three-dimensional habitat. An animal can hide between the individual strands of a plurality of adjacent strands and the animals can hide from each other. This makes the animals feel more protected which is believed to enhance their growth rates as well as lower their mortality rates. In addition, the habitats are movable at all times and response to the water circulation and permit a better flow of the water in the tank. This also affords a better and more even distribution of the food. As a further advantage, the strands have a slight motion due to the water flow. This better approximates the natural environment. Also, when it is desired to transfer the animals to the next stage tank, it is only necessary to lift the spokes out of the tank water. The animals clinging to the strands will slide off. It has been found that the strands permit a more complete and easier removal of the animals than the screens.

The use of the strands also increases the population density of animals which can be stocked in a tank over that possible with screens. The habitats can be located fairly closely together and the individual strands of different bunches of strands and those from adjacent spokes can intermingle in a random manner. As also should be apparent, the spoke arrangement permits ready removal of individual spokes and their attached habitats so that the habitats and/or tank can be emptied and/or cleaned. If desired, the individual spokes 136 can be connected together at the center of the tank 110 and at their outer ends so that the complete unit of spokes can be manipulated at the same time.

FIG. 12 shows another arrangement for holding the habitats in the post-larval tank. Here, the grass-like habitats are suspended from rings 160 of increasing diameter which are mounted on a pair of support members 162 which extend diametrically across the tank 110. The rings 160 also can be of plastic tubing which is slit to accept the bunches of the strands as in FIG. 11. By lifting the support members 162, the complete assembly of rings with attached habitats are lifted out of the tank water. The rings 160 also can be attached to the cross-members 162; suspended by cables above the tank; or mounted in any other suitable manner.

FIGS. 14 and 15 show the details of one of the growing tanks 112, 114, 116 or 118. It should be understood that the structures for all of these tanks are similar, the principle difference being size. As in the case of the post-larval tank 110, tank 112 has a drain 170 covered by a screen 172 which leads to the outflow line and a filter system, if used. A water inlet 129 is also provided.

The tank contains a number of habitats 180 which are spaced around the bottom of the tank. Whereas the habitats of FIGS. 5 and 6 were made of tubular pipe sections, providing a generally circular habitat area for a given animal, the habitats of FIGS. 14 and 15 provide generally rectangular, or square, habitat areas. The habitat 180 is formed in any of a number of different ways. For example, a number of individual sheets of a suitable material, such as an inert plastic, can be used. These sheets would have slits extending part way across. The sheets would then be interlocked transverse to each other to form the structure. A sloping arrangement is used for the habitat, as in FIGS. 3 and 4. This arrangement is similar to the packing of a carton for a number of bottles. However, the carton does not have the angular slope which the habitat has.

It should be understood that the habitat can be formed by molding. In this case, the shapes of the individual habitat areas can be selected as desired by making the mold of the appropriate shape. Thus, for example, polygonal and irregular shapes can be obtained in addition to the circular and rectangular shapes heretofore disclosed.

Whatever the shape used for the habitats 180, it is preferred that they be placed on the bottom of the tank on suitable members, such as standoffs 48, or be formed with bases so that water can circulate below the first floor of the habitat. Tracks 42 can be provided, as in FIGS. 3 and 4, to hold the habitats. Alternatively, the habitats can be formed with legs extending downwardly from an intermediate level to rest on the tank bottom. As a further alternative, the first level of the habitat can extend further back and be longer than the upper levels so that a plurality of legs or standoffs can be attached to the lower level of the structure. In this way the structure will be self-supporting.

FIG. 15 shows the details of the transfer tunnel between two adjacent tanks, designated tanks 112 and 114 for purposes of explanation. Each tank rests on a base 190 with tank 112 being elevated relative to tank 114. Each tank also has a gate 192 with a sealing gasket 194 therearound which seals an opening 195. The gate is movable up and down either normally or by power driven apparatus (not shown). The transfer tunnel 125 is a tubular member which is connected to the walls of both tanks 112 and 114 to cover around the opening 195 covered by the respective gate 192. The transfer tunnel has a water inlet 197 and valve 198 and a water outlet valve 199 and drain 200.

Consider the operation of the system of FIG. 15 where the contents of tank 112, juvenile animals, are to be transferred into tank 114 for the next stage of the growing cycle. Water is admitted into transfer tunnel 125 through valve 198 until the pressure on both sides of gates 192 of tank 112 is equalized. During this time gate 192 of tank 114 is closed. After the pressure has equalized, the gate of tank 112 is raised. Due to the elevation of tank 112, its contents will flow into tank 114. When tank 114 is full, tank 112 being completely or almost completely empty, the gate of tank 114 is closed and tunnel 125 is emptied through drain 200. The same arrangement can be used between each pair of adjacent tanks and the transfer of animals carried out in succession so that the largest diameter tank is filled from the next smaller tank and so forth up the line.

What is claimed is:

1. Apparatus to provide a suitable environment for the maturation of crustacenas during the post-larval period comprising at least one tank and means within said tank for providing individual habitats for individual crustaceans to mature, said habitats comprising means forming a plurality of individual compartments which are arranged in rows one above the other as a vertically slanted unit, said compartment forming means including portions that are generally flat.

2. The apparatus of claim 1 wherein said compartment forming means comprises a plurality of generally flat pieces of material which are attached together to form an enclosure.

3. The apparatus of claim 1 wherein said habitat forming means are placed one adjacent the other in a pattern to form a generally closed path.

4. The apparatus of claim 3 wherein said tank is of generally circular configuration and said closed path is of generally circular shape.

5. The apparatus of claim 3 wherein each said compartment forming means comprises a structure which form flat walls for the compartments.

6. The apparatus of claim 4 wherein said compartments are open at both ends thereof and means are provided for circulating water in the tank through said compartments.

7. The apparatus of claim 1 further comprising a second tank, means for providing fluid flow communication between the two tanks, said second tank having means for providing habitats which includes means forming a plurality of individual compartments in rows which are arranged one on top of the other in a vertically slanted unit.

8. The apparatus of claim 7 wherein each said compartment forming means comprises a structure which form flat walls for the compartments.

9. The apparatus of claim 8 wherein said habitat forming means are placed one adjacent the other in a pattern to form a generally closed path.

10. The apparatus of claim 8 wherein said tank is of generally circular configuration and said closed path is of generally circular shape.

* * * * *